United States Patent [19]

Holme

[11] Patent Number: 5,409,650
[45] Date of Patent: Apr. 25, 1995

[54] MOLDING FINELY DIVIDED SINTERABLE MATERIAL

[75] Inventor: John D. Holme, Rugby, England

[73] Assignee: T&N Technology Limited, Warwickshire, England

[21] Appl. No.: 182,207

[22] PCT Filed: Aug. 17, 1992

[86] PCT No.: PCT/GB92/01513

§ 371 Date: Jan. 7, 1994

§ 102(e) Date: Jan. 7, 1994

[87] PCT Pub. No.: WO93/04014

PCT Pub. Date: Mar. 4, 1993

[30] Foreign Application Priority Data

Aug. 23, 1991 [GB] United Kingdom ............... 9118270

[51] Int. Cl.$^6$ ............................................. C04B 35/634
[52] U.S. Cl. ...................................... 264/63; 264/109; 264/234; 264/328.1
[58] Field of Search ................... 264/63, 328.18, 328.1; 419/36, 37, 38, 65; 252/184, 194

[56] References Cited

U.S. PATENT DOCUMENTS

| | | | |
|---|---|---|---|
| 4,403,056 | 9/1983 | Giolito et al. | 524/280 |
| 4,680,154 | 7/1987 | Matsubara et al. | 264/63 |
| 4,784,812 | 11/1988 | Saitoh et al. | 264/63 |

FOREIGN PATENT DOCUMENTS

| | | |
|---|---|---|
| 0220017 | 4/1987 | European Pat. Off. . |
| 3611271 | 10/1987 | Germany . |
| 1129112 | 10/1968 | United Kingdom . |
| 1396182 | 6/1975 | United Kingdom . |

Primary Examiner—Christopher A. Fiorilla
Attorney, Agent, or Firm—Nixon & Vanderhye

[57] ABSTRACT

Dispersions of sinterable powder, for example, of metal or high-melting-point non-metal such as silicon, or a ceramic substance such as silicon carbide, silicon nitride or alumina, are hot injection-molded using a dispersion of the sinterable material in a binder which, like the dispersion, is solid at room temperature and fluid at the temperature of molding, forming a molded product of uniform density. The binder employed contains polystyrene, which forms the predominant weight proportion of the binder, and in lower weight proportion, an organic compound, e.g., diphenyl carbonate, which is solid at room temperature, is soluble in the molten polystyrene, and is more soluble than the polystyrene is in a lower aliphatic alcohol or ketone. After molding, the binder is removed in non-solid form as vapor, or by dissolution in a solvent, or by oxidation to volatile materials, to leave a porous structure of uniform density.

9 Claims, No Drawings

MOLDING FINELY DIVIDED SINTERABLE MATERIAL

This invention relates to the molding of finely divided sinterable material, such as a powder of metal or high-melting-point non-metal (e.g. silicon) or ceramic substance such as silicon carbide, silicon nitride or alumina.

The invention provides a method by which a dispersion of sinterable material can be injection-molded under moderate pressure to a product whose shape is of considerable complexity, the product being not only of uniform density but also such that the binder employed can be readily removed from it, so as to obtain a porous structure with density still uniform (though, of course, lower) and with shape essentially unaffected. This in turn enables subsequent sintering to be carried out with no substantial change in shape from that of the direct product of injection molding.

The method of the invention depends on the use of a novel binder of our discovery, which has the necessary property of being solid at room temperature and fluid at the elevated temperature of injection molding. The binder comprises (i) a solid polystyrene, which forms the predominant weight ingredient of the binder, and (ii) in lower weight proportion, an organic compound which is soluble in the molten polystyrene and is more soluble than polystyrene in a lower aliphatic alcohol or ketone, examples of which are methanol, ethanol, propanol, isopropanol, acetone and methyl ethyl ketone.

Preferably the organic compound has a melting point of at least 50° C. Preferred organic compounds are those whose molecular structure includes an aromatic ring, for example diphenyl carbonate (melting point about 80° C.).

According to the invention there is provided a method which comprises injection-molding at elevated temperature a dispersion of finely divided sinterable material in a binder, to obtain a molded product of uniform density, both the dispersion and the binder being solid at room temperature and fluid at the temperature of molding, said binder comprising (i) polystyrene, which forms the predominant weight proportion of the binder, and (ii) in lower weight proportion, an organic compound which is solid at room temperature, is soluble in molten polystyrene and is preferentially soluble in a lower aliphatic alcohol or ketone; and removing said binder in non-solid form from the molded product, to leave a porous sinterable structure of uniform density.

The solid dispersion may additionally include a wax and/or a dispersant. It may also include an ethylene/vinyl acetate copolymer suitably in an amount 0.5–2.5$^w$/o of the dispersion to improve the rigidity of the molded product while the binder is being removed from it in non-solid form. In the latter expression we include removal by sublimation, by dissolution in a liquid solvent such as one of those (methanol etc.) previously referred to, and by controlled oxidation to form volatile products, e.g. benzoic acid, carbon dioxide and water vapor.

According to a preferred feature, the binder is removed from the molded product in two stages, in the first of which the major part of the organic compound is removed as vapour at elevated temperature; and subsequently the polystyrene, with any residue of the organic compound, is removed at further-elevated temperature.

According to an alternative preferred feature, the binder is removed from the molded product in two stages, in the first of which the major part of the organic compound is removed by dissolution in a solvent liquid; and subsequently the polystyrene, with any residue of the organic compound, is removed at elevated temperature.

The solid dispersion may conveniently by prepared by mixing the finely divided sinterable material with a solution of the polystyrene and the organic compound in a relatively volatile organic solvent (preferably of boiling point below 100° C.), and evaporating said solvent from the mixture thus formed.

Preferred proportions of the various ingredients of the dispersion are as follows:

| Ingredient | Main Function | % By Weight |
| --- | --- | --- |
| 1. Sinterable material | — | 70–95 |
| 2. Polystyrene | Major Binder Component | 2–10 |
| 3. Diphenyl Carbonate | Minor Binder Component | 2–10 |
| 4. Wax | Minor Binder Component | 0.5–5 |
| 5. Dispersant | Dispersion of Powder in Organic Medium | 0.5–5 |
| 6. Plasticizer | Viscosity Modifier | 0.2–2 |
| 7. Ethylene vinyl Acetate Co-polymer | Improves Structural Rigidity During Binder Removal | 0–2.5 |

Molding is preferably carried out with a screw-type injection molder.

The invention is further illustrated by the following examples.

EXAMPLE 1

This example illustrates the application of the invention to the preparation of a porous sinterable structure from silicon powder of particle size below 20 microns (mean particle size 5 microns).

A solid-form dispersion was prepared from the following ingredients:

| Ingredient | % By Weight |
| --- | --- |
| 1. Silicon Powder | 81.0 |
| 2. Polystyrene mol wt ($M_w$) = 150,000–300,000 $T_G$ = 98° C. | 6.8 |
| 3. Diphenyl carbonate m. pt = 80° C. | 4.7 |
| 4. Wax Ethylene Bis Stearoyl Amide | 2.6 |
| 5. Surfactant Polymerized Fatty Acid | 3.0 |
| 6. Plasticizer Di Butyl Phthalate | 0.9 |
| 7. Ethylene/Vinyl Acetate Copolymer Melt Index: 60 dg/min VA content = 40 wt % | 1.0 |
|  | 100.0 |

The ingredients 2, 3 and 5–7 were dissolved in methyl ethyl ketone (MEK), and a fine powder of the wax (4) was added to the resulting MEK solution. The resulting low-viscosity liquid thus obtained was gently churned with the silicon powder in a sigma blade mixer at ambient temperature. A free-flowing homogenous crumble was obtained from the resulting mixture by distilling off the MEK under reduced pressure.

The crumble was fusible to a pseudoplastic suspension of a viscosity 600 Pa.S measured at a shear rate of 1000 s$^{-1}$, at a temperature of 120° C. It was subsequently molded at that temperature in a standard screw-type machine [Negri Bossi NB90 or Arburg 270M-350-90].

The resulting products, which were of uniform density and robust enough to be handled in the usual way, were then treated by one of two methods in order to remove the binder in non-solid form (i.e. as vapor, liquid or gas) and leave a porous sinterable structure of uniform density.

a. The products were heated at 50°–70° C. under reduced pressure (1 mm) to cause the diphenyl carbonate (mp 80° C.) to sublime without causing the molded product to distort. Once the bulk of the diphenyl carbonate had been removed, the molded products were heated in a forced air circulation oven at 20° C./hr to 400°–450° C. to oxidise the polystyrene to volatile material including benzoic acid, carbon dioxide and water vapor.

b. The products were immersed in methanol for 24 hours at ambient temperature, to dissolve at least 65% of the diphenyl carbonate content (i.e. to remove it in liquid form), and were then heated to 420° C. at 20° C./hour to oxidize the polystyrene and residual diphenyl carbonate as in a.

If the procedure of the above example is carried out without the minor proportion of diphenyl carbonate in the binder, then a considerably higher pressure is required to injection mold and molding has to be performed at a much higher temperature (190° C.). Additionally more than twice as long a time is needed for removal of the binder—a removal which has to be effected entirely by thermal degradation.

The porous products resulting from the above procedures which had good strength and rigidity were heated to 1360° C. in a nitrogen atmosphere over a period of 38 hours to yield reaction bonded silicon nitride with a final density of 2.40 g/cc.

EXAMPLE 2

Following generally the procedure of Example 1, a solid-form dispersion of the following composition was prepared from a stainless steel powder of particle size below 44 microns (mean particle size 11 microns):

| Ingredient | % By Weight |
|---|---|
| 1. Stainless Steel Powder (316L) | 93.0 |
| 2. Polystyrene | 2.5 |
| 3. Diphenyl Carbonate | 2.2 |
| 4. Wax | 1.0 |
| 5. Surfactant | 1.1 |
| 6. Plasticizer | 0.2 |
| | 100.00 |

The crumble obtained generally as in Example 1 was injection molded this time at 100° C in a standard screw-type machine as in Example 1.

The molded products obtained were immersed in a stirred solution of industrial methylated spirit for 120 hours at ambient temperature to dissolve at least 95% of the diphenyl carbonate content, and were then heated to 450° C. at 15° C./hour in a stream of 75% $H_2$/25% $N_2$, held at this temperature for three hours and finally heated at 100° C./hour to 750° C. in the same atmosphere. The porous, easily handleable structures thus obtained exhibited good shape retention, and were sintered in a conventional manner at a temperature of 1280° C. to yield a product of 94% theoretical density.

I claim:

1. A method of preparing a porous sinterable structure of uniform density comprising the steps of:
   (a) injection-molding at elevated temperature a dispersion of finely divided sinterable material in a binder, to obtain a molded product of uniform density, both the dispersion and the binder being solid at room temperature and fluid at the temperature of molding, said binder comprising (i) polystyrene, which forms the predominant weight proportion of the binder, and (ii) in lower weight proportion, diphenyl carbonate which is solid at room temperature, is soluble in molten polystyrene and is more soluble than polystyrene in a lower alkyl aliphatic alcohol or ketone; and
   (b) removing the binder in a two step process in non-solid form from the molded product by (i) vaporizing or dissolving a major part of the diphenyl carbonate, and thereafter (ii) removing any residue of the diphenyl carbonate and the polystyrene by heating at an elevated temperature, to leave a porous sinterable structure of uniform density.

2. The method according to claim 1, in which the solid dispersion of sintered material and binder additionally contains a wax.

3. The method according to claim 2, in which the wax is ethylene bis stearoyl amide.

4. The method according to claim 1, in which the solid dispersion additionally contains an ethylene/vinyl acetate copolymer.

5. The method according to claim 1, in which in step (i), the major part of the diphenyl carbonate is removed as a vapor at an elevated temperature and subsequently in step (ii), the polystyrene, with any residue of the diphenyl carbonate, is removed at a further elevated temperature.

6. The method according to claim 1, in which in step (i), the major part of the diphenyl carbonate is removed by dissolution in a solvent liquid or vapor and subsequently in step (ii), the polystyrene, with any residue of the diphenyl carbonate, is removed at elevated temperature.

7. The method according to claim 1, in which the solid dispersion is prepared by mixing the finely divided sinterable material with a solution of the polystyrene and the diphenyl carbonate in a volatile organic solvent, and evaporating the solvent from the mixture thus formed.

8. The method according to claim 1, in which injection molding is carried out with a screw-type injection molder.

9. The method of making a shaped article, which comprises sintering a porous sinterable structure of uniform density obtained by the method of claim 1.

* * * * *